(12) United States Patent
Wadhwa et al.

(10) Patent No.: US 11,514,402 B2
(45) Date of Patent: Nov. 29, 2022

(54) MODEL SELECTION USING GREEDY SEARCH

(71) Applicant: Microsoft Technology Licensing, LLC, Redmond, WA (US)

(72) Inventors: Mohit Wadhwa, New Delhi (IN); Sumit Srivastava, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 243 days.

(21) Appl. No.: 16/834,738

(22) Filed: Mar. 30, 2020

(65) Prior Publication Data

US 2021/0304151 A1 Sep. 30, 2021

(51) Int. Cl.
*G06Q 10/10* (2012.01)
*G06Q 10/06* (2012.01)
*G06Q 30/08* (2012.01)
*G06N 20/20* (2019.01)

(52) U.S. Cl.
CPC ......... *G06Q 10/1053* (2013.01); *G06N 20/20* (2019.01)

(58) Field of Classification Search
CPC ............................ G06Q 10/1053; G06N 20/20
USPC .................................................. 705/1.1, 321
See application file for complete search history.

(56) References Cited

U.S. PATENT DOCUMENTS

| 2016/0048766 A1* | 2/2016 | McMahon | G06N 20/20 706/12 |
| 2017/0357879 A1* | 12/2017 | Odaibo | A61B 3/14 |
| 2018/0060738 A1* | 3/2018 | Achin | G06Q 10/04 |

OTHER PUBLICATIONS

Caruana, et al., "Ensemble Selection from Libraries of Models", In Proceedings of the Twenty-first International Conference on Machine Learning, Jul. 4, 2004, 8 Pages.

(Continued)

*Primary Examiner* — Jonathan P Ouellette
(74) *Attorney, Agent, or Firm* — Schwegman Lundberg & Woessner, P.A.

(57) ABSTRACT

Techniques for selecting models using greedy search on validation metrics are disclosed herein. A system generates corresponding predictions for a validation dataset using a plurality of prediction models. The system selects one of the prediction models for inclusion in an ensemble set based on the selected prediction model generating more correct predictions for the validation dataset than the other prediction models, and then removes the selected prediction model from the plurality of prediction models to form a reduced plurality of prediction models. The system identifies remaining data records of the validation dataset for which the selected prediction model generated an incorrect prediction, and then selects an additional prediction model from the reduced plurality of prediction models for inclusion in the ensemble set based on a determination that the additional prediction model generated more correct predictions for the remaining data records than the other prediction models in the reduced plurality of prediction models.

20 Claims, 10 Drawing Sheets

(56) References Cited

OTHER PUBLICATIONS

Partalas, et al., "Pruning an Ensemble of Classifiers via Reinforcement Learning", In Journal of Neurocomputing, vol. 72, Issues 7-9, Mar. 1, 2009, pp. 1900-1909.

Rokach, Lior, "Collective-Agreement-Based Pruning of Ensembles", In Journal of Computational Statistics & Data Analysis, vol. 53, Issue 4, Feb. 15, 2009, pp. 1015-1026.

Wichard, Jorg D., "Model Selection in an Ensemble Framework", In Proceedings of IEEE International Joint Conference on Neural Network Proceedings, Jul. 16, 2006, pp. 2187-2192.

* cited by examiner

800

🔍 SEARCH FOR JOBS — 820

RECOMMENDED JOBS FOR YOU    810

SOFTWARE QA ENGINEER
ACME INC.
SAN FRANCISCO, CA
SOFTWARE QA ENGINEER TO PROVIDE SUPPORT TO UNDERSTAND USAGE MODELS AND DEVELOP TEST PLANS ...

SR. SOFTWARE ENGINEER
WAYNE ENTERPRISES
PALO ALTO, CA
2+ YEARS OF EXPERIENCE IN SOA, DATA AND APPLICATION INTEGRATION, WEB SERVICES, ESB ...

SOFTWARE ENGINEER
METROPOLIS CORP.
SAN MATEO, CA
THIS POSITION IS IDEAL FOR C/C++/ANDROID EXPERIENCE. WE ARE LOOKING FOR A HANDS-ON SELF-STARTER ...

SEE MORE ▽

*FIG. 8*

MODEL SELECTION USING GREEDY SEARCH

TECHNICAL FIELD

The present application relates generally to systems and methods, and computer program products for selecting models using greedy search validation in which the locally optimal choice is made at each stage with the intent of finding a global optimum.

BACKGROUND

Online services sometimes use prediction models to perform some of their functions. However, prediction models often suffer from deficiencies in their ability to generate accurate predictions for each and every input. Although ensemble methods may use multiple prediction models to improve prediction performance, prior art solutions for selecting which prediction models to use as part of the ensemble prune through every possible subset of given trained models, which may be exponential in terms of the number of trained models, thereby increasing the workload for the underlying computer system and resulting in a slow selection process. As a result, the functioning of the underlying computer system of the online service is negatively affected. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 8 illustrates a GUI in which recommendations of online job postings selected using an ensemble model set are displayed on a page corresponding to a user, in accordance with an example embodiment.

DETAILED DESCRIPTION

I. Overview

Example methods and systems of selecting models using greedy search on validation metrics are disclosed. In the following description, for purposes of explanation, numerous specific details are set forth in order to provide a thorough understanding of example embodiments. It will be evident, however, to one skilled in the art that the present embodiments may be practiced without these specific details.

The above-discussed technical problems of an extremely large workload and a slow model selection process are addressed by one or more example embodiments disclosed herein, in which a specially-configured computer system takes a set of trained prediction models and a validation dataset, and then uses a greedy algorithm to select a subset of the trained prediction models to form an ensemble model set based on the performance of the trained prediction models on the validation dataset. Since greedy algorithms make the locally optimal choice at each stage of a selection process with the intent of finding a global optimum, the use of a greedy selection process as disclosed herein avoids the pruning through of every possible subset of given trained models, which can be exponential in terms of the number of trained models. As a result, the given an extremely large number of trained models, the specially-configured computer system of the present disclosure is able to perform model selection in a fast and robust manner, reducing the workload for the computer system in selecting trained prediction models for use in ensemble methods and increasing the speed of the selection process. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

Figure 1:
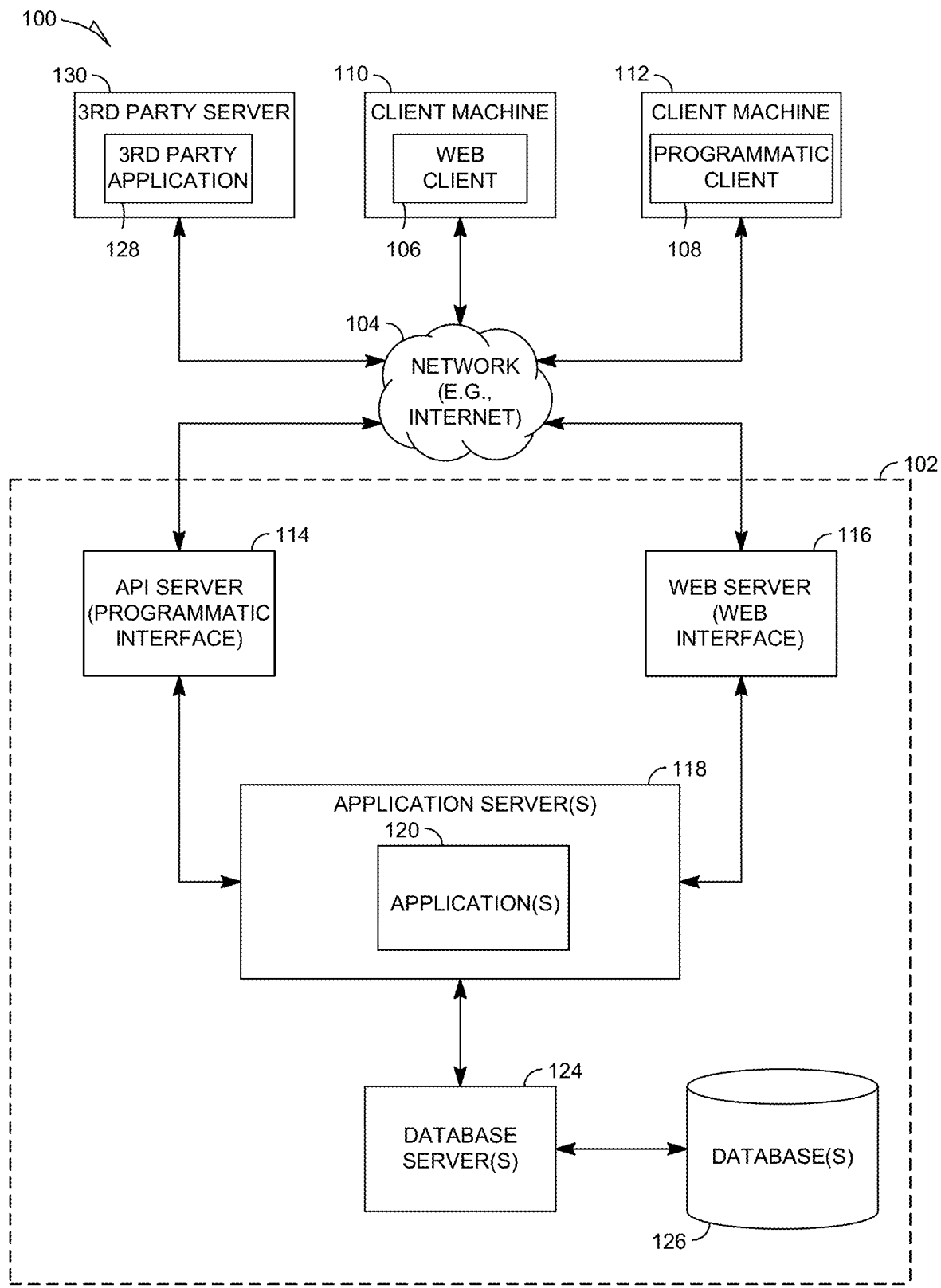
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third-party. The third-party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
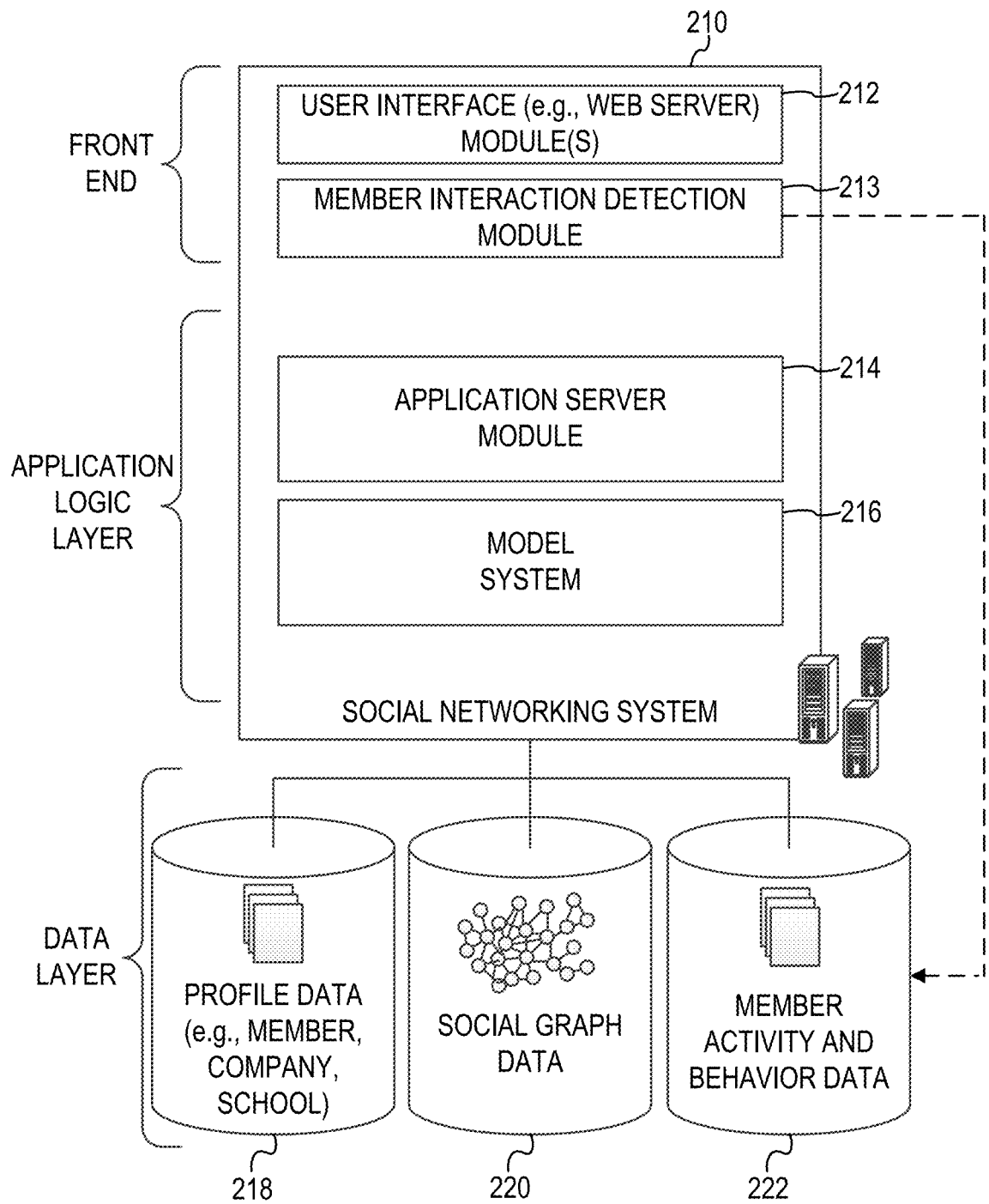
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a model system 216, for use in social networking system 210, consistent with some embodiments of the present disclosure. In some embodiments, the model system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the model system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the model system 216. The members' interactions and behavior may also be tracked, stored, and used by the model system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third-party applications and services.

Although the model system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
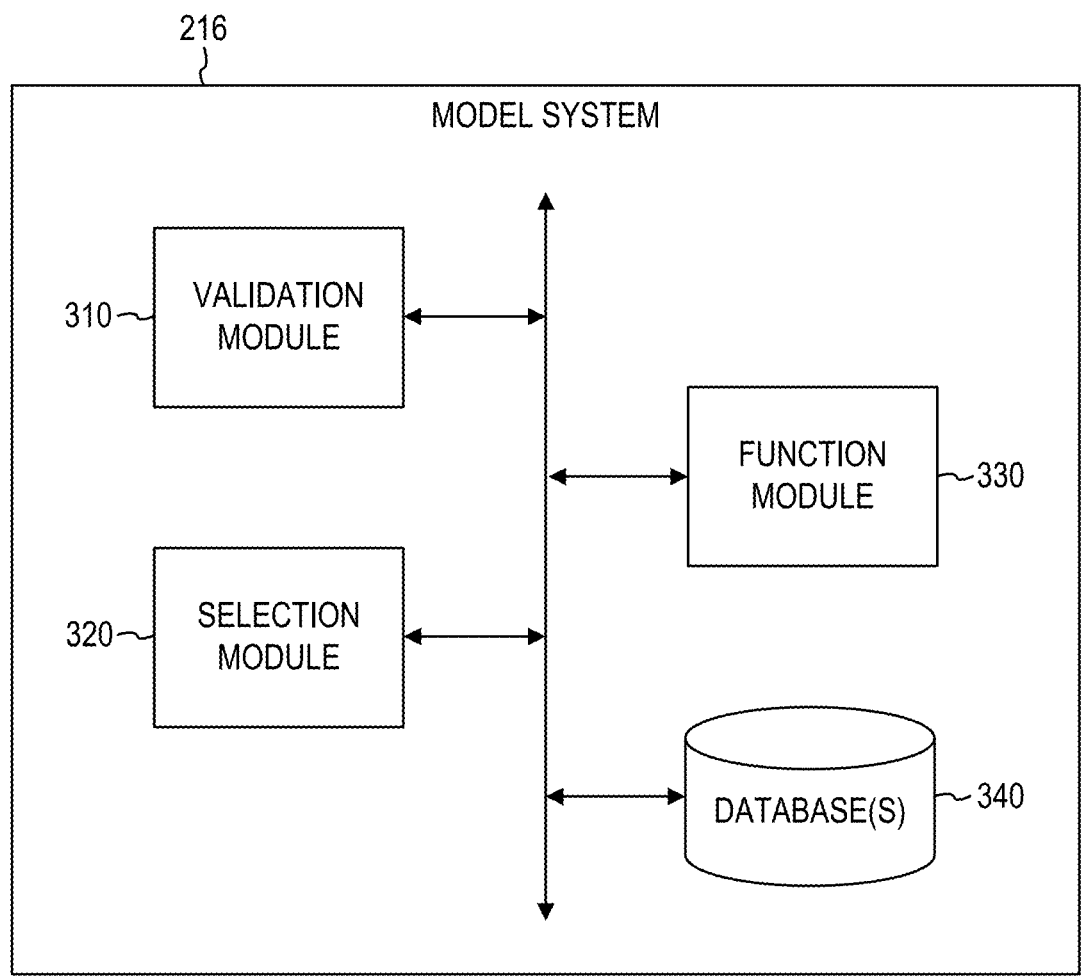
FIG. 3 is a block diagram illustrating components of a model system, in accordance with an example embodiment.

FIG. 3 is a block diagram illustrating components of a model system 216, in accordance with an example embodiment. The model system 216 is configured to select models from a set of trained models such that the combination of the selected models maximizes validation performance. In some example embodiments, the model system 216 is configured to use this combination of selected models as an ensemble model set in ensemble modelling for one or more functions of an online service.

Ensemble modelling is a process where multiple diverse base models are used to predict an outcome. Even though the ensemble model has multiple base models within the model, it acts and performs as a single model. The motivation for using ensemble models is to reduce the generalization error of the prediction. An ensemble model works by training different models on a dataset and having each model make predictions individually. The predictions of these models are then combined in the ensemble model to make a final prediction. Every model has its strengths and weaknesses. Ensemble models can be beneficial by combining individual models to help hide the weaknesses of an individual model.

Figure 4:
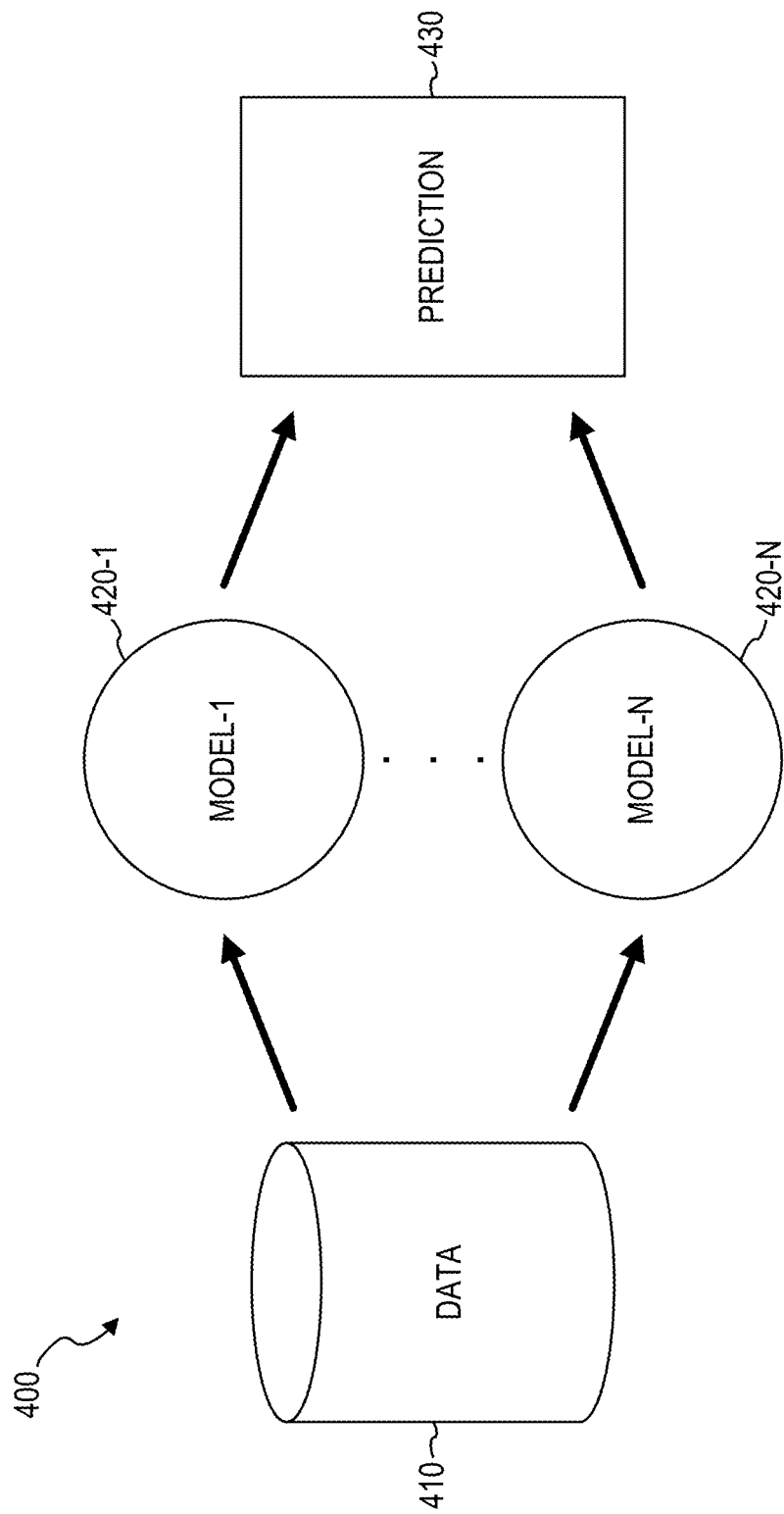
FIG. 4 illustrates a conceptual flow of an ensemble model set being used to generate a prediction for use in a function of an online service, in accordance with an example embodiment.

FIG. 4 illustrates a conceptual flow 400 of an ensemble model set being used to generate a prediction for use in a function of an online service, in accordance with an example embodiment. The ensemble model set comprises a plurality of models 420 (e.g., MODEL-1 420-1, . . . , MODEL-N 420-N). Data 410 is input into each one of the plurality of models 420 of the ensemble model set, and the plurality of models 420 of the ensemble model set are used to generate a single prediction 430 for the input data 410. A variety of ensemble modelling techniques are within the scope of the present disclosure and may be used by the model system 216. Examples of ensemble modelling techniques that may be used by the model system 216 include, but are not limited to, a Bayes optimal classifier, bootstrap aggregating, boosting, Bayesian model averaging, Bayesian model combination, bucket of models, and stacking.

The Bayes optimal classifier is a classification technique. It is an ensemble of all the hypotheses in the hypothesis space. The naive Bayes optimal classifier is a version of this that assumes that the data is conditionally independent on the class and makes the computation more feasible. Each hypothesis is given a vote proportional to the likelihood that the training dataset would be sampled from a system if that hypothesis were true. To facilitate training data of finite size, the vote of each hypothesis is also multiplied by the prior probability of that hypothesis.

Bootstrap aggregating, also known as bagging, involves having each model in the ensemble vote with equal weight. In order to promote model variance, bagging trains each model in the ensemble using a randomly drawn subset of the training set. As an example, the random forest algorithm combines random decision trees with bagging to achieve very high classification accuracy.

Boosting involves incrementally building an ensemble by training each new model instance to emphasize the training instances that previous models misclassified. Most boosting algorithms consist of iteratively learning weak classifiers with respect to a distribution and adding them to a final strong classifier. When they are added, they are typically weighted in some way that is usually related to the weak learners' accuracy. After a weak learner is added, the data weights are readjusted, known as re-weighting. Misclassified input data gain a higher weight and examples that are classified correctly lose weight. Thus, future weak learners focus more on the examples that previous weak learners misclassified.

Bayesian model averaging (BMA) is an ensemble technique that seeks to approximate the Bayes optimal classifier by sampling hypotheses from the hypothesis space and combining them using Bayes' law. Hypotheses are typically sampled using a Monte Carlo sampling technique such as MCMC. For example, Gibbs sampling may be used to draw hypotheses that are representative of the distribution. It has been shown that under certain circumstances, when hypotheses are drawn in this manner and averaged according to Bayes' law, this technique has an expected error that is bounded to be at most twice the expected error of the Bayes optimal classifier.

Bayesian model combination (BMC) is an algorithmic correction to Bayesian model averaging (BMA). Instead of sampling each model in the ensemble individually, it samples from the space of possible ensembles (e.g., with model weightings drawn randomly from a Dirichlet distribution having uniform parameters). This modification overcomes the tendency of BMA to converge toward giving all of the weight to a single model. Although BMC is somewhat more computationally expensive than BMA, it tends to yield dramatically better results. The results from BMC have been shown to be better on average (with statistical significance) than BMA, and bagging.

A "bucket of models" is an ensemble technique in which a model selection algorithm is used to choose the best model for each problem. When tested with only one problem, a bucket of models can produce no better results than the best model in the set, but when evaluated across many problems, it will typically produce much better results, on average, than any model in the set.

Stacking (sometimes called stacked generalization) involves training a learning algorithm to combine the predictions of several other learning algorithms. First, all of the other algorithms are trained using the available data. Then, a combiner algorithm is trained to make a final prediction using all the predictions of the other algorithms as additional inputs.

In some example embodiments, the model system 216 uses a greedy approach for selecting a subset of trained models from a larger set of trained models set, where the model selection is configured to optimize one or more given performance metrics on a validation dataset. In this greedy approach, the model system 216 takes a set of trained models and computes a performance metric value (e.g., a model recall value) of all of the trained models on a validation dataset. The model system 216 then selects the model with the best performance metric value and adds the selected model to an ensemble model set. Then, the model system 216 removes the selected model from the set of trained models and modifies the validation dataset to remove data records for which the selected model predicted correctly, thereby leaving only the data records for which the selected model predicted incorrectly. The model system 216 continues to select the best performing model from the remaining set of trained models, adding the selected model to the ensemble model set, removing the selected model from the remaining set of trained models, and modifying the validation dataset to remove data records for which the newly selected model predicted correctly, until there is no improvement with adding another model. Once the selection of models is completed, the model system 216 may use any ensemble modelling technique to combine the selected models in the ensemble model set for use in generating predictions for performance of a function of an online service.

In one example of the greedy approach of the present disclosure, model recall is used as a validation metric that is used for greedy selection of models. Model recall is the fraction of the total amount of relevant instances that were actually retrieved by the model being analyzed. In other words, recall refers to the percentage of total relevant results correctly classified by the model. Other types of validation metrics may be used as well.

In the example, 'N' is the number of given models, 'M' is the models set $M=\{m_1, m_2, m_3, \ldots m_N\}$ where each '$m_i$' represents a trained model, 'V' represent the validation dataset, and 'S' is the selected models set, which is a subset of 'M'. Initially set 'S' is empty. In some example embodiments, the model system 216 uses the following algorithm to select the models for the ensemble model set:

Step 1: Given N, M, S and V.

Step 2: Select best recall model from models set M on validation set V. This selected model is mx.

Step 3: Add mx to selected models set S and remove mx from models set M.

Step 4: Select best recall model from models set M on validation set V' where V' is a subset of records from validation set V for which models in set S does not predict correctly. This selected model is $m_y$.

Step 5: Check to determine if improvement criteria is satisfied. If the improvement criteria is satisfied, then go to step 6; otherwise, go to step 7. The improvement criteria may comprise any criteria that indicates that adding selected model $m_y$ to the selected models set S provides a minimum threshold amount of improvement on the current selected models set S. The improvement criteria may be defined in different ways. In one example embodiment, the improvement criteria comprises a requirement that the selected model $m_y$ is predicting more than p records correctly, where p is a lower limit threshold on the number of records in validation set V'.

Step 6: Add $m_y$ to selected models set S and remove $m_y$ from models set M. Go back to step 4 and repeat the process.

Step 7: Return set S as selected models set.

Referring back to FIG. 3, in some embodiments, the model system 216 comprises any combination of one or more of a validation module 310, a selection module 320, a function module 330, and one or more database(s) 340. The validation module 310, the selection module 320, the function module 330, and the database(s) 340 can reside on a computer system, or other machine, having a memory and at least one processor (not shown). In some embodiments, the validation module 310, the selection module 320, the function module 330, and the database(s) 340 can be incorporated into the application server(s) 118 in FIG. 1. In some example embodiments, the database(s) 340 is incorporated into database(s) 126 in FIG. 1 and can include any combination of one or more of databases 218, 220, and 222 in FIG. 2. However, it is contemplated that other configurations of the validation module 310, the selection module 320, the function module 330, and the database(s) 340, are also within the scope of the present disclosure.

In some example embodiments, one or more of the validation module 310, the selection module 320, and the function module 330 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the validation module 310, the selection module 320, and the function module 330 is configured to receive user input. For example, one or more of the validation module 310, the selection module 320, and the function module 330 can present one or more GUI elements (e.g., drop-down menu, selectable buttons, text field) with which a user can submit input.

In some example embodiments, one or more of the validation module 310, the selection module 320, and the function module 330 is configured to perform various communication functions to facilitate the functionality described herein, such as by communicating with the social networking system 210 via the network 104 using a wired or wireless connection. Any combination of one or more of the validation module 310, the selection module 320, and the function module 330 may also provide various web services or functions, such as retrieving information from the third party servers 130 and the social networking system 210. Information retrieved by the any of the validation module 310, the selection module 320, and the function module 330 may include profile data corresponding to users and members of the social networking service of the social networking system 210.

Additionally, any combination of one or more of the validation module 310, the selection module 320, and the function module 330 can provide various data functionality, such as exchanging information with database(s) 340 or servers. For example, any of the validation module 310, the selection module 320, and the function module 330 can access member profiles that include profile data from the database(s) 340, as well as extract attributes and/or characteristics from the profile data of member profiles. Furthermore, the one or more of the validation module 310, the selection module 320, and the function module 330 can access social graph data and member activity and behavior data from database(s) 340, as well as exchange information with third party servers 130, client machines 110, 112, and other sources of information.

In some example embodiments, the validation module 310 is configured to receive a plurality of trained prediction models. The validation module 310 may train the plurality of prediction models itself. Alternatively, the plurality of prediction models may be trained by another module or system, and the validation module 310 may access the plurality of trained prediction models from a database in which the plurality of trained prediction models are stored (e.g., the plurality of trained prediction models may be stored in and accessed from the database(s) 340). Each one of the prediction models may be trained via supervised learning using training data, such as pairs of input data and corresponding output data (e.g., a corresponding label for the input data).

In some example embodiments, the validation module 310 is configured to, for each one of the plurality of trained prediction models, generate corresponding predictions for a validation dataset using the trained prediction model. Similar to the training data used to train the plurality of prediction models, the validation dataset may comprise pairs of input data and corresponding output data (e.g., a corresponding label for the input data). In some example embodiments, the validation dataset is defined by a plurality of data records (e.g., the input data), and each one of the trained prediction models generates each prediction based on a corresponding one of the plurality of data records. In some example embodiments, the validation module 310 is configured to determine, for each one of the trained prediction models, which predictions of the prediction model were correct and which predictions of the prediction model were incorrect by comparing the corresponding prediction for each data record of the validation dataset with the corresponding label for the data record. The validation module 310 may calculate a performance metric value for each trained prediction model based on the determination of correct predictions and incorrect predictions of the trained prediction model.

In some example embodiments, the selection module 320 is configured to select a trained prediction model from the plurality of trained prediction models for inclusion in an ensemble model set based on a determination that the selected trained prediction model has the best performance metric value amongst the plurality of trained prediction models. For example, the selection module 320 may select the trained prediction model based on a determination that the selected trained prediction model generated more correct predictions for the validation dataset than the other trained prediction models in the plurality of trained prediction models.

In some example embodiments, the selection module 320 is configured to add the selected trained prediction model to the ensemble model set based on the selection of the trained prediction model. The ensemble model set may initially be empty prior to the first selection of one of the trained prediction models for inclusion in the ensemble model set. The adding of the selected trained prediction model to the ensemble model set may comprise modifying a representation of the ensemble model set stored in the database(s) 340 to include the selected trained prediction model.

In some example embodiments, the selection module 320 is configured to remove the selected trained prediction model from the plurality of trained prediction models to form a reduced plurality of trained prediction models based on the selection of the trained prediction model. The removing of the selected trained prediction model from the plurality of trained prediction models may comprise modifying a list of the plurality of trained prediction models stored in the database(s) 340 to exclude the selected trained prediction model.

In some example embodiments, the selection module 320 is configured to identify one or more remaining data records of the validation dataset for which the selected trained prediction model, and any other trained prediction models in the ensemble model set, generated an incorrect prediction. By identifying the remaining data records of the validation dataset for which the selected trained prediction model generated an incorrect prediction, the selection module 320 focuses subsequent selections of trained prediction models from the reduced plurality of trained prediction models on aspects of the validation dataset that have not been adequately addressed by the current ensemble model set.

In some example embodiments, the selection module 320 is configured to select an additional trained prediction model from the reduced plurality of trained prediction models for inclusion in the ensemble model set based on a determination that the selected additional trained prediction model has the best performance metric value amongst the reduced plurality of trained prediction models. For example, the selection module 320 may select the additional trained prediction model from the reduced plurality of trained prediction models for inclusion in the ensemble model set based on a determination that the additional trained prediction model generated more correct predictions for the identified remaining data record(s) than the other trained prediction models in the reduced plurality of trained prediction models.

In some example embodiments, the selection module 320 is configured to add the selected additional trained prediction model to the ensemble model set and to remove the selected additional trained prediction model from the reduced plurality of trained prediction models based on the selection of the additional trained prediction model. The adding of the selected additional trained prediction model to the ensemble model set and the removing of the selected additional trained prediction model from the reduced plurality of trained prediction models may be further based on a determination that an improvement criteria is satisfied. The improvement criteria may comprise any criteria that indicates that adding the selected additional model to the ensemble model set provides a minimum threshold amount of improvement on the current ensemble model set. In some example embodiments, the improvement criteria comprises the selected additional trained prediction model generating a total number of correct predictions for the one or more remaining data records of the validation set that satisfies a threshold value, such as a minimum number of correct predictions. The threshold value may be independent of corresponding total numbers of correct predictions generated by the other trained prediction models in the reduced plurality of trained prediction models, such that the additional trained prediction model is not being added to the ensemble model set simply because the additional trained prediction model had more correct predictions that all of the other trained prediction models in the reduced plurality of trained prediction models.

In some example embodiments, the selection module 320 is configured to repeat the operations of identifying remaining data records for which the selected prediction models of the ensemble model set have generated incorrect predictions, selecting another additional prediction model from the reduced plurality of prediction models, adding the newly-selected additional trained prediction model to the ensemble model set, and removing the newly-selected additional trained prediction model from the reduced plurality of trained prediction models until the improvement criteria is no longer satisfied. When the selection module 320 determines that the improvement criteria is no longer satisfied, the selection module 320 may end the selection process and finalize the ensemble model set.

In some example embodiments, the function module 330 is configured to perform a function of an online service using the finalized ensemble model set. The function module 330 may use any ensemble technique to combine the selected predictions models of the finalized ensemble model set into a single ensemble model that generates a prediction in performing the function of the online service. For example, the function module 330 may use one or more of the previously discussed ensemble modelling techniques, including, but not limited to, a Bayes optimal classifier, bootstrap aggregating, boosting, Bayesian model averaging, Bayesian model combination, bucket of models, and stacking. Other ensemble modelling techniques are also within the scope of the present disclosure.

In some example embodiments, the function of the online service comprises causing digital content to be displayed on a computing device of a user of the online service, and the ensemble model set is used to select the digital content for display on the computing device of the user. Examples of the digital content include, but are not limited to, feed data to be displayed on a page corresponding to the user, one or more recommendations of other users of the online service, and one or more recommendations of online job postings that are accessible via the online service. Other functions and other types of digital content are also within the scope of the present disclosure.

In one example of how the model system 216 may select the prediction models of the ensemble model set using the greedy selection approach, the model system 216 selects models from a set of trained models M=$\{m_1, m_2, m_3, m_4, m_5\}$ using a validation dataset V=$\{r_1, r_2, r_3, r_4, r_5, r_6\}$, where each '$m_i$' represents a trained model and each '$r_i$' represents a data record, given the following performance metrics:

$m_1$: predicted $r_1, r_2, r_3, r_4$ correctly and $r_5, r_6$ incorrectly
$m_2$: predicted $r_5, r_6$ correctly and $r_1, r_2, r_3, r_4$ incorrectly
$m_3$: predicted $r_1, r_3, r_5$ correctly and $r_2, r_4, r_6$ incorrectly
$m_4$: predicted $r_1, r_2, r_5$ correctly and $r_3, r_4, r_6$ incorrectly
$m_5$: predicted $r_2, r_4,$ correctly and $r_1, r_3, r_5, r_6$ incorrectly In this example above, during its first past through the greedy algorithm, the model system 216 selects $m_1$ for inclusion in the ensemble model set based on $m_1$ having the highest number of correct predictions (four correct predictions) for the validation dataset V amongst all of the models in M. The model system 216 adds $m_1$ to the ensemble model set and removes $m_1$ from the set of trained models M being considered for selection. In the next cycle through the greedy algorithm, the model system 216 identifies $r_5$ and $r_6$ as being the data records in the validation dataset V for which the selected model $m_1$ did generate a correct prediction, and then selects $m_2$ for inclusion in the ensemble model set based on $m_2$ having the highest number of correct predictions (two correct predictions) for the identified data records r5 and r6 amongst the remaining set of trained models $m_2, m_3, m_4, m_5$, even though models $m_3$ and $m_4$ each have more correct predictions (three correct predictions each) for the entire original validation dataset V=$\{r_1, r_2, r_3, r_4, r_5, r_6\}$. The model system 216 adds $m_2$ to the ensemble model set. Since all of the data records in the original validation dataset V have been addressed by the selection of models $m_1$ and $m_2$, the model system 216 determines that no further significant improvement can be achieved by selecting another model for inclusion in the ensemble model set, and therefore finalizes the ensemble model set as consisting of models $m_1$ and $m_2$.

Figure 5:
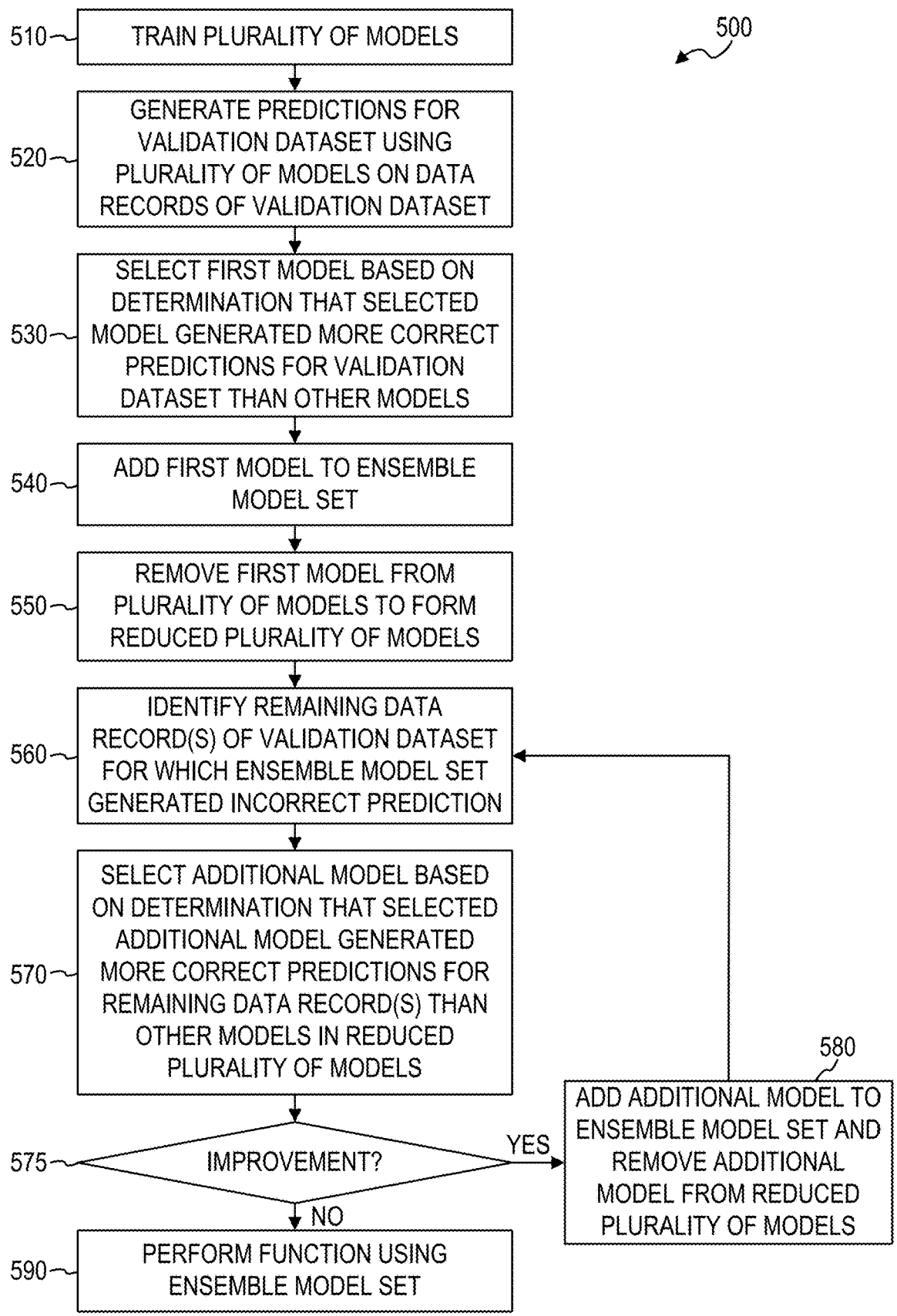
FIG. 5 is a flowchart illustrating a method of selecting models for inclusion in an ensemble model set using greedy search validation metrics, in accordance with an example embodiment.

FIG. 5 is a flowchart illustrating a method 500 of selecting models for inclusion in an ensemble model set using greedy search validation metrics, in accordance with an example embodiment. The method 500 can be performed by processing logic that can comprise hardware (e.g., circuitry, dedicated logic, programmable logic, microcode, etc.), software (e.g., instructions run on a processing device), or a combination thereof. In one implementation, the method 500 is performed by the model system 216 of FIGS. 2-3, or any combination of one or more of its modules (e.g., the validation module 310, the selection module 320, the function module 330), as described above.

At operation 510, the model system 216 trains a plurality of prediction models. Each one of the prediction models may be trained via supervised learning using training data, such as pairs of input data and corresponding output data (e.g., a corresponding label for the input data). The plurality of trained prediction models may be stored in the database(s) 340 for subsequent access. In some alternative embodiments, instead of the model system 216 training the plurality of prediction model, the plurality of prediction models may be trained by another system and subsequently provided to the model system 216 for use in the post-training operations of the method 500.

At operation 520, the model system 216, for each one of the plurality of trained prediction models, generates corresponding predictions for a validation dataset using the trained prediction model. Similar to the training data used to train the plurality of prediction models, the validation dataset may comprise pairs of input data and corresponding output data (e.g., a corresponding label for the input data). In some example embodiments, the validation dataset is defined by a plurality of data records (e.g., the input data), and each one of the trained prediction models generates each prediction based on a corresponding one of the plurality of data records. In some example embodiments, the model system 216 determines, for each one of the trained prediction models, which predictions of the prediction model were correct and which predictions of the prediction model were incorrect by comparing the corresponding prediction for each data record of the validation dataset with the corresponding label for the data record. The model system 216 may calculate a performance metric value for each trained prediction model based on the determination of correct predictions and incorrect predictions of the trained prediction model.

At operation 530, the model system 216 selects a first trained prediction model from the plurality of trained prediction models for inclusion in an ensemble model set based on a determination that the selected first trained prediction model has the best performance metric value amongst the plurality of trained prediction models. For example, the model system 216 may select the first trained prediction model based on a determination that the selected first trained prediction model generated more correct predictions for the validation dataset than the other trained prediction models in the plurality of trained prediction models.

At operation 540, the model system 216 adds the selected first trained prediction model to the ensemble model set based on the selection of the trained prediction model. The ensemble model set may initially be empty prior to the selection of the first trained prediction model for inclusion in the ensemble model set. The adding of the selected first trained prediction model to the ensemble model set may comprise modifying a representation of the ensemble model set stored in the database(s) 340 to include the selected first trained prediction model.

At operation 550, the model system 216 removes the selected first trained prediction model from the plurality of trained prediction models to form a reduced plurality of trained prediction models based on the selection of the first trained prediction model. The removing of the selected first trained prediction model from the plurality of trained prediction models may comprise modifying a list of the plurality of trained prediction models stored in the database(s) 340 to exclude the selected first trained prediction model.

At operation 560, the model system 216 identifies one or more remaining data records of the validation dataset for which the selected first trained prediction model, and any other trained prediction models in the ensemble model set, generated an incorrect prediction. By identifying the remaining data records of the validation dataset for which the selected trained prediction model and any other trained prediction models in the ensemble model set generated an incorrect prediction, the model system 216 focuses subsequent selections of trained prediction models from the reduced plurality of trained prediction models on aspects of the validation dataset that have not been adequately addressed by the current ensemble model set.

At operation 570, the model system 216 selects an additional trained prediction model from the reduced plurality of trained prediction models for inclusion in the ensemble model set based on a determination that the selected additional trained prediction model has the best performance metric value amongst the reduced plurality of trained prediction models. For example, the model system 216 may select the additional trained prediction model from the reduced plurality of trained prediction models for inclusion in the ensemble model set based on a determination that the additional trained prediction model generated more correct predictions for the identified remaining data record(s) than the other trained prediction models in the reduced plurality of trained prediction models.

At operation 575, the model system 216 determines whether an improvement criteria is satisfied. The improvement criteria may comprise any criteria that indicates that adding the selected additional model to the ensemble model set provides a minimum threshold amount of improvement on the current ensemble model set. In some example embodiments, the improvement criteria comprises the selected additional trained prediction model generating a total number of correct predictions for the one or more remaining data records of the validation set that satisfies a threshold value, such as a minimum number of correct predictions. The threshold value may be independent of corresponding total numbers of correct predictions generated by the other trained prediction models in the reduced plurality of trained prediction models, such that the additional trained prediction model is not being added to the ensemble model set simply because the additional trained prediction model had more correct predictions that all of the other trained prediction models in the reduced plurality of trained prediction models.

If it is determined at operation 575 that the improvement criteria is satisfied, then the model system 216 proceeds to operation 580, where the model system 216 adds the selected additional trained prediction model to the ensemble model set and removes the selected additional trained prediction model from the reduced plurality of trained prediction models based on the selection of the additional trained prediction model. The model system 216 then returns to operation 560, where the model system 216 identifies one or more remaining data records of the validation dataset for which the current ensemble model set have generated an incorrect prediction.

If it is determined at operation 575 that the improvement criteria is not satisfied, then the model system 216 proceeds to operation 590, where the model system 216 performs a function of an online service using the finalized ensemble model set. The model system 216 may use any ensemble technique to combine the selected predictions models of the finalized ensemble model set into a single ensemble model that generates a prediction in performing the function of the online service. For example, the model system 216 may use one or more of the previously discussed ensemble modelling techniques, including, but not limited to, a Bayes optimal classifier, bootstrap aggregating, boosting, Bayesian model averaging, Bayesian model combination, bucket of models, and stacking. Other ensemble modelling techniques are also within the scope of the present disclosure.

In some example embodiments, the function of the online service comprises causing digital content to be displayed on a computing device of a user of the online service, and the ensemble model set is used to select the digital content for display on the computing device of the user. Examples of the digital content include, but are not limited to, feed data to be displayed on a page corresponding to the user, one or more recommendations of other users of the online service, and one or more recommendations of online job postings that are accessible via the online service. Other functions and other types of digital content are also within the scope of the present disclosure.

It is contemplated that any of the other features described within the present disclosure can be incorporated into the method 500.

Figure 6:
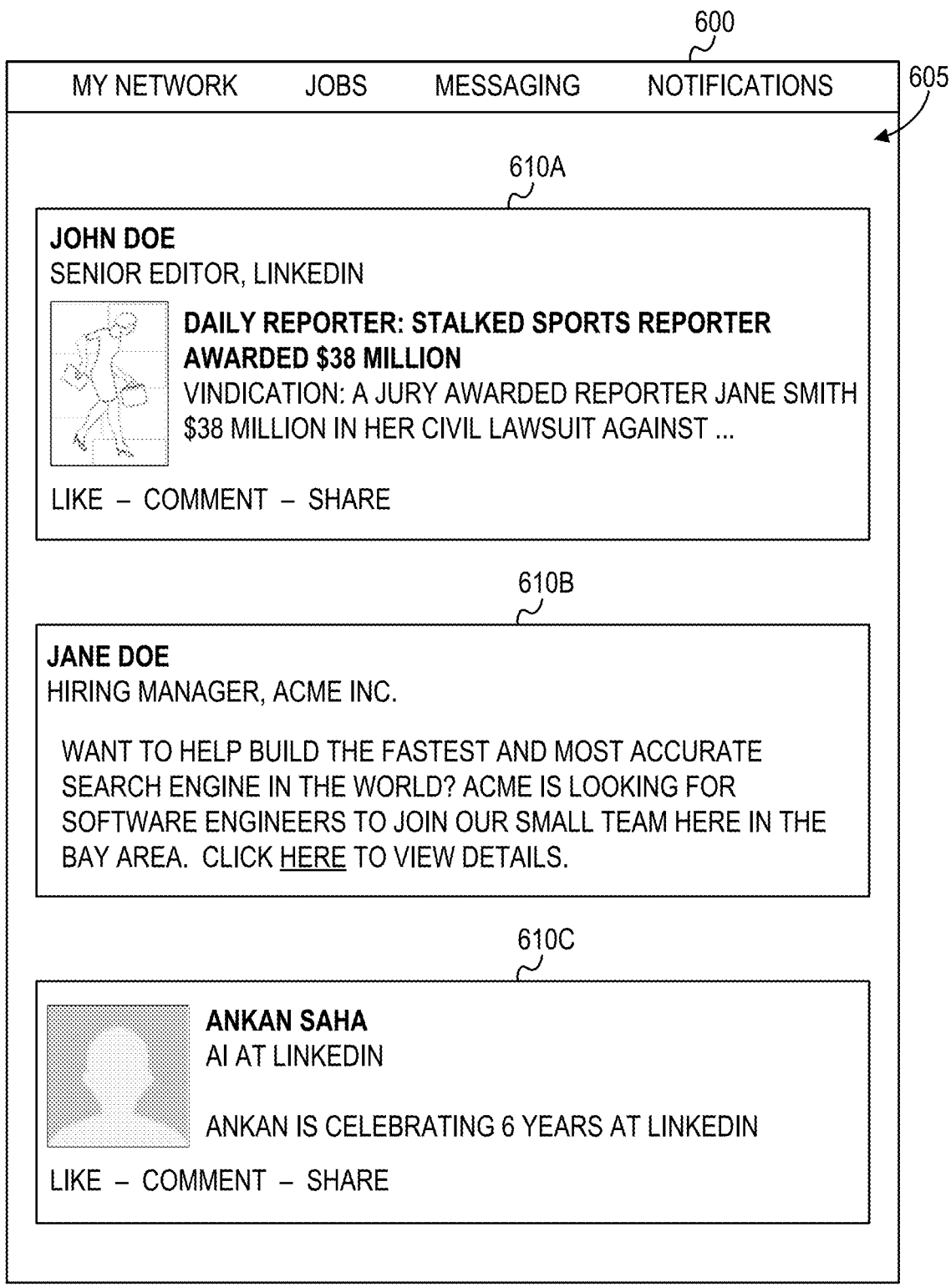
FIG. 6 illustrates a graphical user interface (GUI) in which feed data selected using an ensemble model set is displayed on a page corresponding to a user, in accordance with an example embodiment.

FIG. 6 illustrates a graphical user interface (GUI) 600 in which feed data selected using an ensemble model set configured by the model system 216 is displayed on a page corresponding to a user, in accordance with an example embodiment. In the example shown in FIG. 6, three different types of content items 610A, 610B, and 610C are displayed within a data feed 605 on a landing page for the user of the online service. Content item 610A comprises an online news article, content item 610B comprises an online job posting, and content item 610C comprises a profile status update of another user of the online service. The content items 610 may be selected for display from amongst a plurality of content items using the ensemble model set by feeding the plurality of content items into single model representing a combination of the prediction models of the ensemble model set to generate prediction values for each content item in the plurality of content items. The plurality of content items may be ranked based on their corresponding prediction values, and one or more content items 610 may be selected for display in the data feed 605 based on the ranking (e.g., the model system 216 may select the top N ranked content items for display, where N is a positive integer).

Figure 7:
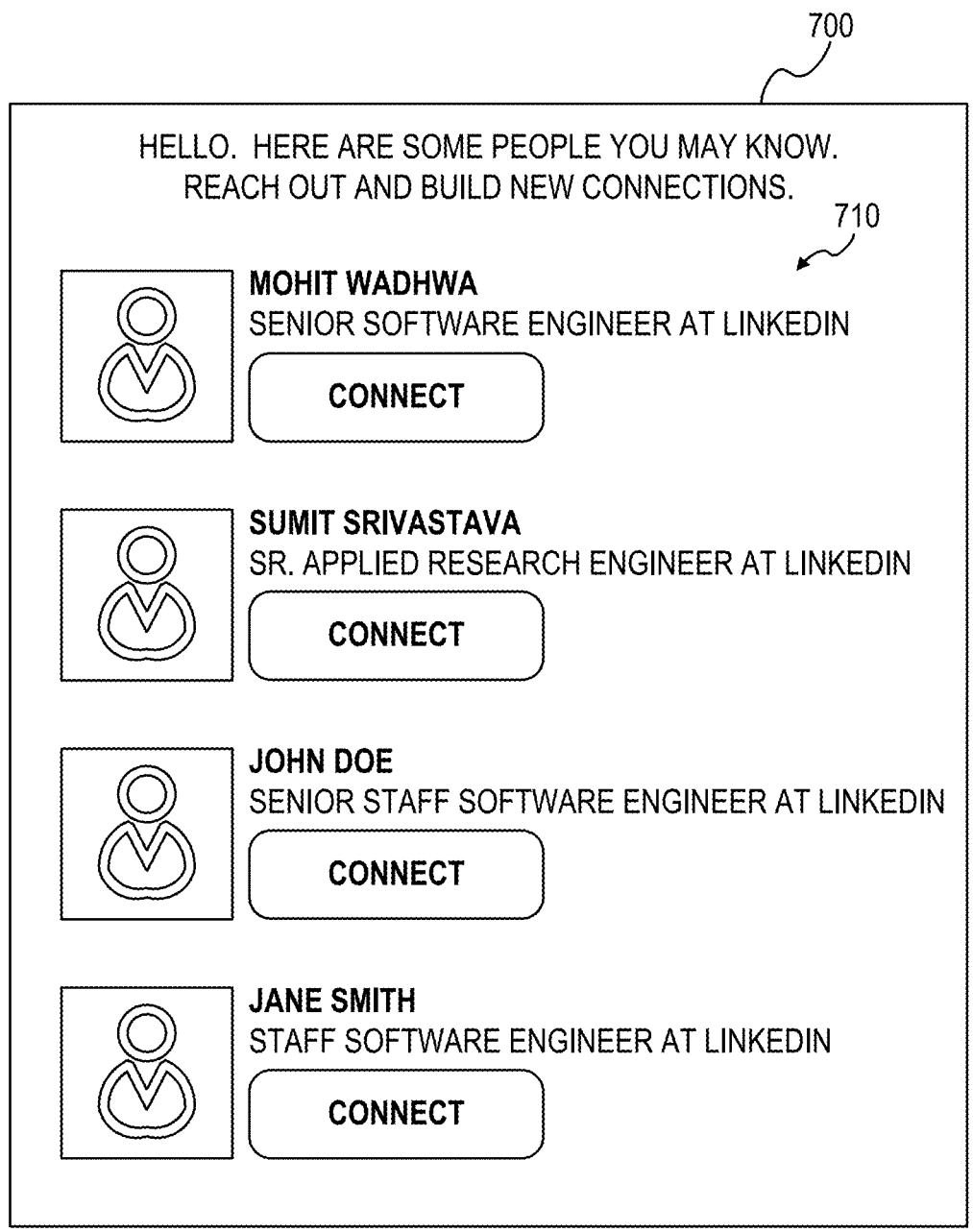
FIG. 7 illustrates a GUI in which recommendations of other users selected using an ensemble model set are displayed on a page corresponding to a user, in accordance with an example embodiment.

FIG. 7 illustrates a GUI 700 in which recommendations of other users selected using an ensemble model set configured by the model system 216 are displayed on a page corresponding to a user, in accordance with an example embodiment. In FIG. 7, the GUI 700 is presented to a source user and displays selectable options 710 to send invitations to destination users to become connections on the social networking service. Each selectable option 710 may comprise an identification of the destination user, an image associated with a profile of the destination user, one or more attributes of the destination user (e.g., job position, company), and a selectable user interface element (e.g., a clickable "CONNECT" button) configured to cause a user-to-user message (e.g., an invitation to connect) to be transmitted to the other user or to cause another type of source user action to be performed. Each selectable option 710 may also comprise another selectable user interface element (not shown) configured to reject or otherwise dismiss the corresponding recommendation so as to indicate an instruction by the source user not to perform the source user action for the destination user of the corresponding recommendation.

FIG. 8 illustrates a GUI 800 in which recommendations 810 of online job postings selected using an ensemble model set configured by the model system 216 are displayed on a page corresponding to a user, in accordance with an example embodiment. In some example embodiments, the online job postings are published on the online service, and the recommendations 810 are caused to be displayed to the user on the computing device of the user. The recommendations 810 may each comprise one or more corresponding selectable user interface elements (e.g., hyperlinked text) configured to display more information about the corresponding online job posting of the recommendation 810 (e.g., to view the entire online job posting rather than just an abbreviated summary of the online job posting) or to enable the user to perform some other type of online action directed towards the online job posting of the recommendation 810, such as saving the online job posting or applying to the online job posting. Each recommendation 810 may include information about the corresponding online job posting, such as a job title, a company name, a geographical location, and desired skills, educational background, and work experience. Other types of information may also be included in the recommendation 810. The GUI 800 may also display one or more user interface elements 820 configured to enable the user to submit a search query for searching for online job postings, such as by entering keyword search terms into a search field. In response to one or more keywords being submitted by the user as part of a search query via the search field, the function module 330 may generate recommendations 810 based on the keyword(s) and feature data of online job postings being evaluated as search results.

Figure 9:
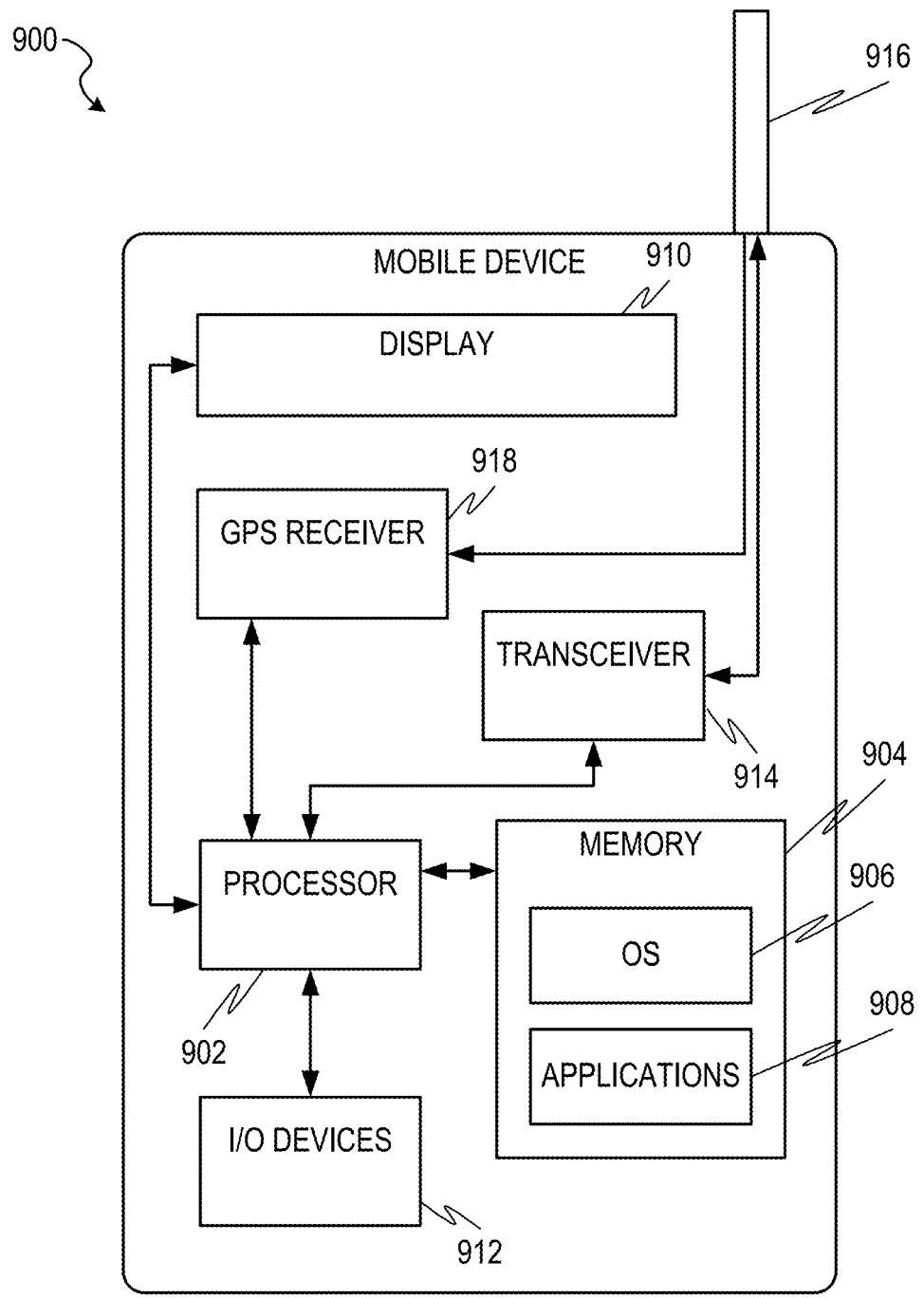
FIG. 9 is a block diagram illustrating a mobile device, in accordance with some example embodiments.

FIG. 9 is a block diagram illustrating a mobile device 900, according to an example embodiment. The mobile device 900 can include a processor 902. The processor 902 can be any of a variety of different types of commercially available processors suitable for mobile devices 900 (for example, an XScale architecture microprocessor, a Microprocessor without Interlocked Pipeline Stages (MIPS) architecture processor, or another type of processor). A memory 904, such as a random access memory (RAM), a Flash memory, or other type of memory, is typically accessible to the processor 902. The memory 904 can be adapted to store an operating system (OS) 906, as well as application programs 908, such as a mobile location-enabled application that can provide location-based services (LBSs) to a user. The processor 902 can be coupled, either directly or via appropriate intermediary hardware, to a display 910 and to one or more input/output (I/O) devices 912, such as a keypad, a touch panel sensor, a microphone, and the like. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
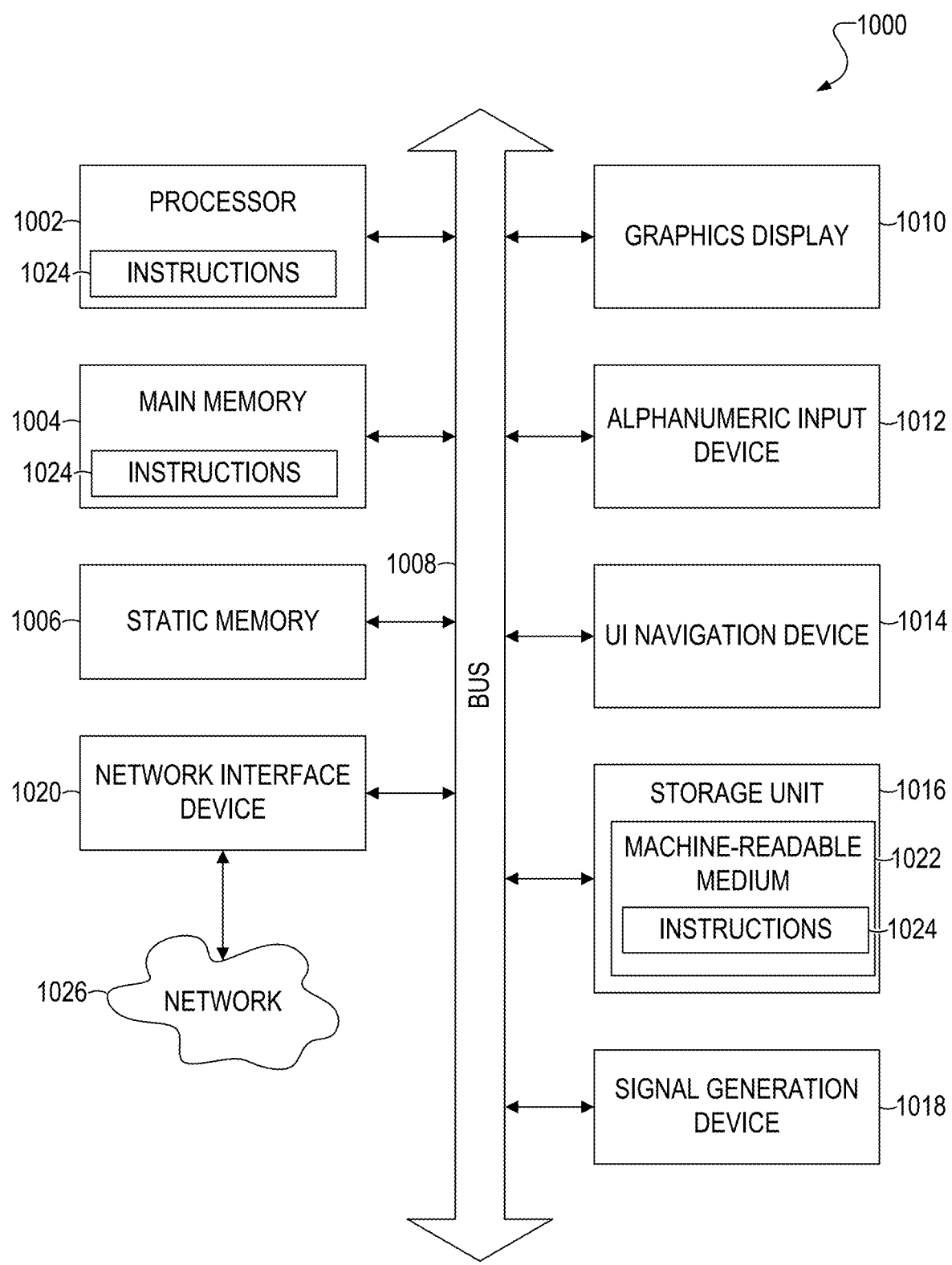
FIG. 10 is a block diagram of an example computer system on which methodologies described herein may be executed, in accordance with an example embodiment.

FIG. 10 is a block diagram of an example computer system 1000 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a graphics display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a storage unit 1016, a signal generation device 1018 (e.g., a speaker) and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions (e.g., instructions 1024) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following paragraphs provide example embodiments.

Example 1 includes a computer-implemented method comprising: for each one of a plurality of trained prediction models, generating, by a computer system having a memory and at least one hardware processor, corresponding predictions for a validation dataset using the trained prediction model, the validation dataset being defined by a plurality of data records, the trained prediction model generating each prediction based on a corresponding one of the plurality of data records; selecting, by the computer system, a first trained prediction model from the plurality of trained prediction models for inclusion in an ensemble model set based on a determination that the first trained prediction model generated more correct predictions for the validation dataset than the other trained prediction models in the plurality of trained prediction models; adding, by the computer system, the first trained prediction model to the ensemble model set based on the selection of the first trained prediction model; removing, by the computer system, the first trained prediction model from the plurality of trained prediction models to form a reduced plurality of trained prediction models based on the selection of the first trained prediction model; identifying, by the computer system, one or more remaining data records of the validation dataset for which the selected first trained prediction model generated an incorrect prediction; selecting, by the computer system, an additional trained prediction model from the reduced plurality of trained prediction models for inclusion in the ensemble model set based on a determination that the additional trained prediction model generated more correct predictions for the one or more remaining data records than the other trained prediction models in the reduced plurality of trained prediction models; adding, by the computer system, the selected additional trained prediction model to the ensemble model set based on the selection of the additional trained prediction model; and performing, by the computer system, a function of an online service using the ensemble model set.

Example 2 includes the computer-implemented method of example 1, wherein the adding of the selected additional trained prediction model to the ensemble model set is further based on a determination that the selected additional trained prediction model generated a total number of correct predictions for the one or more remaining data records of the validation set that satisfies a threshold value that is independent of corresponding total numbers of correct predictions generated by the other trained prediction models in the reduced plurality of trained prediction models.

Example 3 includes the computer-implemented method of example 2, further comprising: removing, by the computer system, the additional trained prediction model from the reduced plurality of trained prediction models based on the selection of the additional trained prediction model to form a further reduced plurality of trained prediction models; identifying, from the one or more remaining data records by the computer system, one or more subsequent remaining data records for which the selected additional trained prediction model generated an incorrect prediction; selecting, by the computer system, another additional trained prediction model from the further reduced plurality of trained prediction models for inclusion in the ensemble model set based on a determination that the other additional trained prediction model generated more correct predictions for the one or more subsequent remaining data records than the other trained prediction models in the further reduced plurality of trained prediction models; and adding, by the computer system, the selected other additional trained prediction model to the ensemble model set based on the selection of the other additional trained prediction model.

Example 4 includes the computer-implemented method of any one of examples 1 to 3, wherein: the adding of the selected additional trained prediction model to the ensemble model set is further based on a determination that the selected additional trained prediction model generated a total number of correct predictions for the one or more remaining data records of the validation set that satisfies a threshold value that is independent of corresponding total numbers of correct predictions generated by the other trained prediction models in the reduced plurality of trained prediction models; and the adding of the selected other additional trained prediction model to the ensemble model set is further based on a determination that the selected other additional trained prediction model generated a total number of correct predictions for the one or more subsequent remaining data records of the validation set that satisfies a threshold value that is independent of corresponding total numbers of correct predictions generated by the other trained prediction models in the further reduced plurality of trained prediction models.

Example 5 includes the computer-implemented method of any one of examples 1 to 4, wherein the function of the online service comprises causing digital content to be displayed on a computing device of a user of the online service, and the ensemble model set is used to select the digital content for display on the computing device of the user.

Example 6 includes the computer-implemented method of any one of examples 1 to 5, wherein the digital content comprises feed data to be displayed on a page corresponding to the user.

Example 7 includes the computer-implemented method of any one of examples 1 to 6, wherein the digital content comprises one or more recommendations of other users of the online service.

Example 8 includes the computer-implemented method of any one of examples 1 to 7, wherein the digital content comprises one or more recommendations of online job postings that are accessible via the online service.

Example 9 includes a system comprising: at least one processor; and a non-transitory computer-readable medium storing executable instructions that, when executed, cause the at least one processor to perform the method of any one of examples 1 to 8.

Example 10 includes a non-transitory machine-readable storage medium, tangibly embodying a set of instructions that, when executed by at least one processor, causes the at least one processor to perform the method of any one of examples 1 to 8.

Example 11 includes a machine-readable medium carrying a set of instructions that, when executed by at least one processor, causes the at least one processor to carry out the method of any one of examples 1 to 8.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   training, by a computer system having a memory and at least one hardware processor, a plurality of prediction models using a machine learning algorithm and training data;
   for each one of the plurality of trained prediction models, generating, by the computer system, corresponding predictions for a validation dataset using the trained prediction model, the validation dataset being defined by a plurality of data records, the trained prediction model generating each prediction based on a corresponding one of the plurality of data records;
   selecting, by the computer system, a first trained prediction model from the plurality of trained prediction models for inclusion in an ensemble model set based on a determination that the first trained prediction model generated more correct predictions for the validation dataset than the other trained prediction models in the plurality of trained prediction models;
   adding, by the computer system, the first trained prediction model to the ensemble model set based on the selection of the first trained prediction model;
   removing, by the computer system, the first trained prediction model from the plurality of trained prediction models to form a reduced plurality of trained prediction models based on the selection of the first trained prediction model;
   identifying, by the computer system, one or more remaining data records of the validation dataset for which the selected first trained prediction model generated an incorrect prediction;
   selecting, by the computer system, an additional trained prediction model from the reduced plurality of trained prediction models for inclusion in the ensemble model set based on a determination that the additional trained prediction model generated more correct predictions for the one or more remaining data records than the other trained prediction models in the reduced plurality of trained prediction models;
   adding, by the computer system, the selected additional trained prediction model to the ensemble model set based on the selection of the additional trained prediction model; and
   performing, by the computer system, a function of an online service using the ensemble model set.

2. The computer-implemented method of claim 1, wherein the adding of the selected additional trained prediction model to the ensemble model set is further based on a determination that the selected additional trained prediction model generated a total number of correct predictions for the one or more remaining data records of the validation set that satisfies a threshold value that is independent of corresponding total numbers of correct predictions generated by the other trained prediction models in the reduced plurality of trained prediction models.

3. The computer-implemented method of claim 1, further comprising:
   removing, by the computer system, the additional trained prediction model from the reduced plurality of trained prediction models based on the selection of the additional trained prediction model to form a further reduced plurality of trained prediction models;
   identifying, from the one or more remaining data records by the computer system, one or more subsequent remaining data records for which the selected additional trained prediction model generated an incorrect prediction;
   selecting, by the computer system, another additional trained prediction model from the further reduced plurality of trained prediction models for inclusion in the ensemble model set based on a determination that the other additional trained prediction model generated more correct predictions for the one or more subsequent remaining data records than the other trained prediction models in the further reduced plurality of trained prediction models; and adding, by the computer system, the selected other additional trained prediction model to the ensemble model set based on the selection of the other additional trained prediction model.

4. The computer-implemented method of claim 3, wherein:
the adding of the selected additional trained prediction model to the ensemble model set is further based on a determination that the selected additional trained prediction model generated a total number of correct predictions for the one or more remaining data records of the validation set that satisfies a threshold value that is independent of corresponding total numbers of correct predictions generated by the other trained prediction models in the reduced plurality of trained prediction models; and
the adding of the selected other additional trained prediction model to the ensemble model set is further based on a determination that the selected other additional trained prediction model generated a total number of correct predictions for the one or more subsequent remaining data records of the validation set that satisfies a threshold value that is independent of corresponding total numbers of correct predictions generated by the other trained prediction models in the further reduced plurality of trained prediction models.

5. The computer-implemented method of claim 1, wherein the function of the online service comprises causing digital content to be displayed on a computing device of a user of the online service, and the ensemble model set is used to select the digital content for display on the computing device of the user.

6. The computer-implemented method of claim 5, wherein the digital content comprises feed data to be displayed on a page corresponding to the user.

7. The computer-implemented method of claim 5, wherein the digital content comprises one or more recommendations of other users of the online service.

8. The computer-implemented method of claim 5, wherein the digital content comprises one or more recommendations of online job postings that are accessible via the online service.

9. A system comprising:
at least one hardware processor; and
a non-transitory machine-readable medium embodying a set of instructions that, when executed by the at least one hardware processor, cause the at least one processor to perform operations, the operations comprising:
training a plurality of prediction models using a machine learning algorithm and training data;
for each one of the plurality of trained prediction models, generating corresponding predictions for a validation dataset using the trained prediction model, the validation dataset being defined by a plurality of data records, the trained prediction model generating each prediction based on a corresponding one of the plurality of data records;
selecting a first trained prediction model from the plurality of trained prediction models for inclusion in an ensemble model set based on a determination that the first trained prediction model generated more correct predictions for the validation dataset than the other trained prediction models in the plurality of trained prediction models;
adding the first trained prediction model to the ensemble model set based on the selection of the first trained prediction model;
removing the first trained prediction model from the plurality of trained prediction models to form a reduced plurality of trained prediction models based on the selection of the first trained prediction model;
identifying one or more remaining data records of the validation dataset for which the selected first trained prediction model generated an incorrect prediction;
selecting an additional trained prediction model from the reduced plurality of trained prediction models for inclusion in the ensemble model set based on a determination that the additional trained prediction model generated more correct predictions for the one or more remaining data records than the other trained prediction models in the reduced plurality of trained prediction models;
adding the selected additional trained prediction model to the ensemble model set based on the selection of the additional trained prediction model; and
performing a function of an online service using the ensemble model set.

10. The system of claim 9, wherein the adding of the selected additional trained prediction model to the ensemble model set is further based on a determination that the selected additional trained prediction model generated a total number of correct predictions for the one or more remaining data records of the validation set that satisfies a threshold value that is independent of corresponding total numbers of correct predictions generated by the other trained prediction models in the reduced plurality of trained prediction models.

11. The system of claim 9, wherein the operations further comprise:
removing the additional trained prediction model from the reduced plurality of trained prediction models based on the selection of the additional trained prediction model to form a further reduced plurality of trained prediction models;
identifying, from the one or more remaining data records, one or more subsequent remaining data records for which the selected additional trained prediction model generated an incorrect prediction;
selecting another additional trained prediction model from the further reduced plurality of trained prediction models for inclusion in the ensemble model set based on a determination that the other additional trained prediction model generated more correct predictions for the one or more subsequent remaining data records than the other trained prediction models in the further reduced plurality of trained prediction models; and
adding the selected other additional trained prediction model to the ensemble model set based on the selection of the other additional trained prediction model.

12. The system of claim 11, wherein:
the adding of the selected additional trained prediction model to the ensemble model set is further based on a determination that the selected additional trained prediction model generated a total number of correct predictions for the one or more remaining data records of the validation set that satisfies a threshold value that is independent of corresponding total numbers of correct predictions generated by the other trained prediction models in the reduced plurality of trained prediction models; and
the adding of the selected other additional trained prediction model to the ensemble model set is further based on a determination that the selected other additional trained prediction model generated a total number of correct predictions for the one or more subsequent remaining data records of the validation set that satisfies a threshold value that is independent of corresponding total numbers of correct predictions generated by the other trained prediction models in the further reduced plurality of trained prediction models.

13. The system of claim 9, wherein the function of the online service comprises causing digital content to be displayed on a computing device of a user of the online service, and the ensemble model set is used to select the digital content for display on the computing device of the user.

14. The system of claim 13, wherein the digital content comprises feed data to be displayed on a page corresponding to the user.

15. The system of claim 13, wherein the digital content comprises one or more recommendations of other users of the online service.

16. The system of claim 13, wherein the digital content comprises one or more recommendations of online job postings that are accessible via the online service.

17. A non-transitory machine-readable medium embodying a set of instructions that, when executed by at least one hardware processor, cause the processor to perform operations, the operations comprising:
training, by a computer system having a memory and at least one hardware processor, a plurality of prediction models using a machine learning algorithm and training data;
for each one of the plurality of trained prediction models, generating, by the computer system, corresponding predictions for a validation dataset using the trained prediction model, the validation dataset being defined by a plurality of data records, the trained prediction model generating each prediction based on a corresponding one of the plurality of data records;
selecting, by the computer system, a first trained prediction model from the plurality of trained prediction models for inclusion in an ensemble model set based on a determination that the first trained prediction model generated more correct predictions for the validation dataset than the other trained prediction models in the plurality of trained prediction models;
adding, by the computer system, the first trained prediction model to the ensemble model set based on the selection of the first trained prediction model;
removing, by the computer system, the first trained prediction model from the plurality of trained prediction models to form a reduced plurality of trained prediction models based on the selection of the first trained prediction model;
identifying, by the computer system, one or more remaining data records of the validation dataset for which the selected first trained prediction model generated an incorrect prediction;
selecting, by the computer system, an additional trained prediction model from the reduced plurality of trained prediction models for inclusion in the ensemble model set based on a determination that the additional trained prediction model generated more correct predictions for the one or more remaining data records than the other trained prediction models in the reduced plurality of trained prediction models;

adding, by the computer system, the selected additional trained prediction model to the ensemble model set based on the selection of the additional trained prediction model; and
performing, by the computer system, a function of an online service using the ensemble model set.

18. The non-transitory machine-readable medium of claim 17, wherein the adding of the selected additional trained prediction model to the ensemble model set is further based on a determination that the selected additional trained prediction model generated a total number of correct predictions for the one or more remaining data records of the validation set that satisfies a threshold value that is independent of corresponding total numbers of correct predictions generated by the other trained prediction models in the reduced plurality of trained prediction models.

19. The non-transitory machine-readable medium of claim 17, wherein the operations further comprise:
removing the additional trained prediction model from the reduced plurality of trained prediction models based on the selection of the additional trained prediction model to form a further reduced plurality of trained prediction models;
identifying, from the one or more remaining data records, one or more subsequent remaining data records for which the selected additional trained prediction model generated an incorrect prediction;
selecting another additional trained prediction model from the further reduced plurality of trained prediction models for inclusion in the ensemble model set based on a determination that the other additional trained prediction model generated more correct predictions for the one or more subsequent remaining data records than the other trained prediction models in the further reduced plurality of trained prediction models; and
adding the selected other additional trained prediction model to the ensemble model set based on the selection of the other additional trained prediction model.

20. The non-transitory machine-readable medium of claim 19, wherein:
the adding of the selected additional trained prediction model to the ensemble model set is further based on a determination that the selected additional trained prediction model generated a total number of correct predictions for the one or more remaining data records of the validation set that satisfies a threshold value that is independent of corresponding total numbers of correct predictions generated by the other trained prediction models in the reduced plurality of trained prediction models; and
the adding of the selected other additional trained prediction model to the ensemble model set is further based on a determination that the selected other additional trained prediction model generated a total number of correct predictions for the one or more subsequent remaining data records of the validation set that satisfies a threshold value that is independent of corresponding total numbers of correct predictions generated by the other trained prediction models in the further reduced plurality of trained prediction models.

* * * * *